United States Patent [19]

Nishio

[11] Patent Number: 4,498,494

[45] Date of Patent: Feb. 12, 1985

[54] AIR CONTROL FOR A LUMBAR SUPPORT DEVICE

[75] Inventor: Shigeru Nishio, Kariya, Japan

[73] Assignee: Aisin Seiki Kabushiki Kaisha, Kariya, Japan

[21] Appl. No.: 480,176

[22] Filed: Mar. 29, 1983

[30] Foreign Application Priority Data

Mar. 31, 1982 [JP] Japan .................... 57-046227[U]

[51] Int. Cl.³ .................. F16K 15/06; F16K 15/20
[52] U.S. Cl. ................... 137/514; 137/116; 137/512; 137/522; 137/540
[58] Field of Search ............ 137/514, 539.5, 543.21, 137/540; 251/355

[56] References Cited

U.S. PATENT DOCUMENTS

| | | | |
|---|---|---|---|
| 1,634,721 | 7/1927 | Nordstrom | 251/355 X |
| 1,998,056 | 4/1935 | Naatz | 251/355 X |
| 3,348,880 | 10/1967 | Swann . | |
| 3,363,941 | 1/1968 | Wierwille . | |
| 3,559,678 | 2/1971 | Donner | 137/539.5 X |

FOREIGN PATENT DOCUMENTS

| | | | |
|---|---|---|---|
| 516777 | 2/1955 | Italy | 137/543.21 |
| 1391887 | 4/1975 | United Kingdom | 137/539.5 |

Primary Examiner—Robert G. Nilson
Attorney, Agent, or Firm—Sughrue, Mion, Zinn, Macpeak & Seas

[57] ABSTRACT

An air controlled valve assembly for a lumbar support device of the type having a plurality of parallel, horizontally disposed air bags located in the seat back of an automobile seat includes a hollow housing having a main air distribution chamber therein and a plurality of individual air supply chambers each of which is adapted to be connected to a respective air bag. A check valve is associated with each individual air supply chamber to control the flow of air under pressure from the main air distribution chamber to the respective air bags. The check valve is adapted to be spring biased into normally closed position against a valve seat and a spring guide member is interposed between the spring and the check valve. The spring guide member is formed with a plurality of radially extending circumferentially spaced apart projections, each of which has a partial circumferential surface adapted to be in sliding engagement with a hollow cylindrical bore. The partial cylindrical surface of each projection has a groove formed therein for retaining a supply of high viscosity oil to dampen the oscillating movement of the spring guide member and check valve due to rapid fluctuations in the air supply.

2 Claims, 2 Drawing Figures

AIR CONTROL FOR A LUMBAR SUPPORT DEVICE

BACKGROUND OF THE INVENTION

The present invention is directed to an air control for a lumbar support device of the type utilized in an automobile seat and more particularly to an air control for a lumbar support device wherein the air pressure of an air bag in a seat back is controlled by the opening and closing action of a spring biased check valve.

It is well known in the art to provide the seat back of an automobile seat with a plurality of horizontally disposed parallel air bags so that the curvature of the seat back can be adjusted by selectively regulating the air pressures in the individual air bags. In a conventional air control system, each air bag is uniformly provided with pressurized air from a common pressurized air source which is admitted through a check valve associated with each air bag. Subsequently, the air pressure in each air bag is selectively released to the atmosphere through its associated check valve through means of a suitable valve control device. Thus, the contour of the seat back may be varied for a particular individual by selectively reducing the air pressure in each of the air bags and controlling the rate of air pressure reduction in each air bag.

However, in those pressure control devices wherein the pressurized air is supplied to the air bags intermittently in a pulsating manner by means of a manual pump or the like, the check valves will be repeatedly opened and closed relative to the valve seat at high speeds. Such a hunting phenomenon related to fluctuation in the pressure of the supplied air results in an abnormal sound or noise being generated which creates a disagreeable or an annoying impression on the driver or a passenger.

In order to prevent the hunting action of a check valve, it has been previously proposed to utilize a spring guide member which is biased by means of a plate-type spring which acts as a damper due to sliding frictional resistance relative to a fixed member during displacement of the check valve. However, such an arrangement utilizing a plate-type damper has proven to be unsatisfactory since the spring load varies widely during manufacture as well as during use of the spring so that it is virtually impossible to set a predetermined pressure value for the opening action of the check valve.

SUMMARY OF THE INVENTION

The present invention provides a new and improved air control for a lumbar support device which eliminates the foregoing disadvantages associated with conventional lumbar support devices. More particularly, the present invention provides an air control for a lumbar support device wherein the hunting phenomenon with respect to the check valve is eliminated to prevent the occurence of undue noises.

The present invention provides a new and improved air control for a lumbar support device wherein a sliding resistance is imparted to each check valve associated with respect to an air bag in a manner which is comparatively simple in construction, reliable in operation and economical to manufacture.

The present invention provides a new and improved air control for a lumbar support device comprising a valve body having a main air supply chamber, means for supplying pressurized air to said main air supply chamber, a plurality of individual air supply chambers adapted to be connected to a respective air bag disposed in communication with said main air supply chamber, a check valve associated with each individual air supply chamber, a spring guide member disposed within each individual air supply chamber, spring means disposed in each individual air supply chamber in contact with said spring guide member for normally biasing said spring guide member against the check valve located in the respective individual air supply chamber for moving said check valve to the closed position, said spring guide member having a plurality of projecting edges formed thereon adapted to be disposed in sliding contact with the walls of each individual air supply chamber, a groove formed on an outer circumferential surface of each projecting edge adapted to store a high viscosity oil whereby the outer circumferential surface of the projecting edge slides on the surface of the individual air supply chamber through the high viscosity oil. Accordingly, when each check valve is displaced at a high speed and repeats the opening and closing actions in response to changes in pressure of the pressurized air supply, a sliding resistence will be imparted to the check valve by means of the viscous oil trapped in the grooves of the spring guide member to create a damper effect. As a result, since the displacement of the check valve is attenuated, the objectionable hunting phenomenon previously noted is prevented from occurring during the opening and closing movement of the respective check valve.

The foregoing and other objects, features and advantages of the invention will be apparent from the following more particular description of a preferred embodiment of the invention as illustrated in the accompanying.

DETAILED DESCRIPTION OF THE INVENTION

Figure 1:
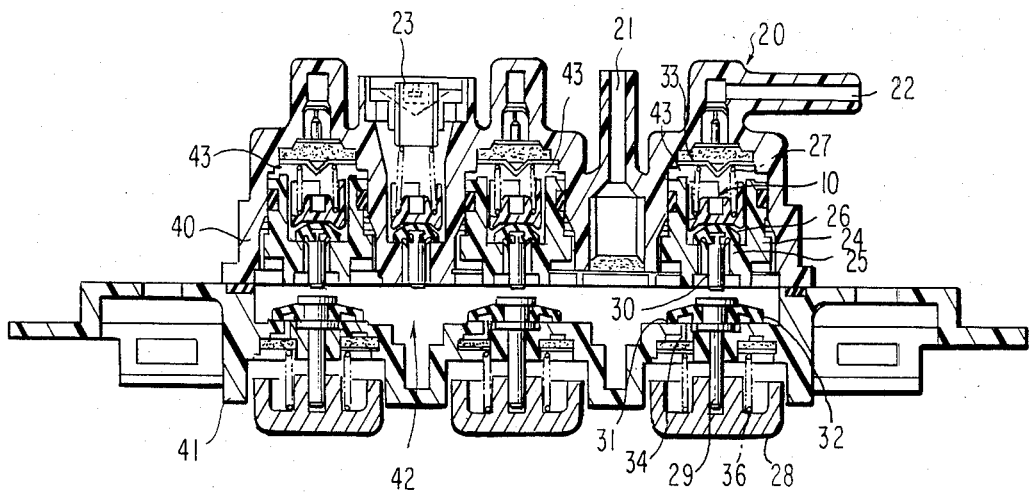
FIG. 1 is a sectional view of a pressure controlled valve device for use with an air bag type lumbar support device incorporating spring guide members according to the present invention.

The air pressure control valve device 20 shown in FIG. 1 is comprised of a two part housing 40 and 41 connected together by any suitable means to define a main air distribution chamber 42. An inlet port 21 adapted to be connected to a manual air pump or any other suitable source of pressurized air is located in the housing part 40 to provide for the admission of pressurized air to the main air distribution chamber 42. An outlet port 23 communicates the atmosphere with the main air distribution chamber 42 under the control of the check valve which controls the maximum pressure within the main air distribution chamber 42. A plurality of individual air distribution chambers are also located in the housing member 40 which are each adapted to be connected to a respective air bag in an automobile seat back. The details of the air bar arrangement and the manner in which they are connected to the individual air distribution chambers are well known in the art and a detailed description of the same is not deemed necessary. A detailed description of one of the individual air control chambers and the check valve arrangement associated therewith for controlling the flow of pressurized air to and from the respective air bag will now be described in detail.

A check valve support member 24 is sealingly located in the individual air distribution chamber 43 and includes a central cylindrical bore having an annular valve seat 25 adjacent the bottom thereof surrounding a passage communicating an individual air distribution chamber 43 with the main air distribution chamber 42. A check valve 26 is located within the cylindrical bore of the check valve support member 24 in contact with the valve seat 25 and is provided with a valve stem 30 which extends into the main air distribution chamber 42. A spring guide member 10 is slidably positioned within the cylindrical bore of the check valve support member 24 and is normally biased into engagement with the check valve 26 by means of a spring 27 located within the individual air distribution chamber 43. Thus, the biasing force of the spring 27 normally forces the check valve 26 into engagement with the valve seat 25 through the spring guide member 10. An air filter 33 is provided in the outlet passage 22 which communicates an individual air distribution chamber 43 with a respective air bag through suitable connecting means.

A pressure relief valve 32 is associated with each check valve 26 and is located in the housing member 41 directly opposite the valve stem 30 of the check valve 26. The pressure relief valve 32 is adapted to engage a valve seat 31 and is connected to a push button 28 by means of a valve stem 29. The push button 28 is normally biased away from the housing member 41 by means of a spring 36 so as to normally bring the valve 32 into engagement with the valve seat 31. A passage 34 is formed through the wall of the housing member 41 to communicate the chamber 42 with the atmosphere. The valve stem 29 of the valve 32 is disposed in direct alignment with the valve stem 30 of the check valve 26.

Figure 2:
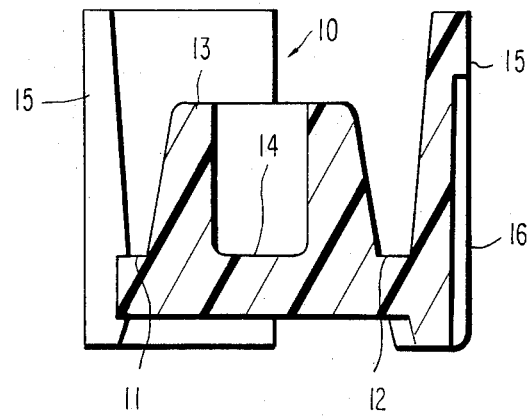
FIG. 2 is an enlarged sectional view of a spring guide member according to the present invention.

The spring guide member 10 is shown in detail in FIG. 2 and is comprised of a cup shaped central portion having an annular wall 13 and a base wall 14. Three guide plates 15 having partial cylindrical outer surfaces are spaced equi-distantly about the cup shaped central portion and are connected thereto by means of support arms 11 and 12. Only two of the guide plates have been illustrated in FIG. 2, and it is obvious that the entire spring guide member may be formed as an integral one-piece molded element. An axially extending groove 16 is formed in the outer cylindrical surface of each guide plate 15. The lower end of the groove 16 is open in the axial direction. Each groove 16 defines an oil reservoir between the respective guide plate 15 and the surface of the cylindrical bore formed in the check valve support member 24.

In operation, when pressurized air is supplied from a manual pump or any other suitable source of pressurized air to the inlet port 21 the first check valve 26 leading to each individual air bag will be maintained in the open position whereby the pressurized air will be supplied from the inlet port 21 through the main air distribution chamber 42 and the air filter 33 to the outlet port 22. If the supply of pressurized air to the inlet port is cut off for any reason, or if the pressure of the pressurized air becomes lower than the biasing force of the spring 27, the check valve 26 will be biased into engagement with the valve seat 25 and maintained in the closed condition by the force of the spring 27. When the check valve 26 is displaced at a high speed and repeatedly opens and closes in response to changes in the pressure of the air supply, the viscous oil in the grooves 16 of each spring guide member 10 will create an added sliding resistance to the movement of a spring guide member. This sliding resistance creates a damper effect which attenuates the movement of the check valve 26 to prevent a hunting action from occurring which might produce undesireable noises.

After the pressurized air is supplied to each air bag to the extent determined by the pressure relief valve in the outlet 23, the control push buttons 28 for each air bag may be selectively operated. When pushing a selected push button 28 inwardly, the valve stem 29 will cause the check valve 32 to open thereby communicating the interior of the main distribution chamber 42 with the atmosphere through the outlet port 34. The inward movement of the push button 28 will cause the valve stem 29 to engage the valve stem 30 of the check valve 26 to move the check valve 26 away from the valve seat 25 thereby allowing the air under pressure within the respective air bag to flow from the air bag to the main air distribution chamber 43 past the open check valve 26 and then to the atmosphere through the port 34 past the open check valve 32. Depending upon the length of time the push button 28 is depressed the air pressure within the respective air bag will be decreased. Upon releasing the push button 28 the check valves 32 and 26 will be moved to the closed position under the influence of the springs 36 and 27, respectively, to maintain the respective air bag at the selected reduced pressure.

While the invention has been particularly shown and described with reference to a preferred embodiment thereof, it will be understood by those in the art that various changes in form and details may be made therein without departing from the spirit and scope of the invention.

What is claimed is:

1. Air controlled valve assembly or a lumbar support device having at least one air bag located in a seat back comprising a hollow housing, inlet means adapted to be connected to a source of air under pressure for introducing air into said housing, at least one outlet means adapted to be connected to an air bag for supplying air from said hollow housing to said air bag, a valve seat located in said outlet means, a check valve located in said outlet means for movement into and out of engagement with said valve seat, spring means located in said outlet means for normally biasing said check valve into engagement with said valve seat and a spring guide member located in said outlet means intermediate said spring means and said check valve means, said spring guide member having a plurality of spaced apart projections including an outer circumferential surface disposed in sliding engagement with said outlet means with an oil reservoir groove formed in said outer circumferential surface of each projection for holding a supply of high viscosity oil to dampen the oscillating movement of said guide member and said check valve in response to rapid fluctuations in air pressure wherein said spring guide member is further comprised of a central portion and a plurality of radially extending support members having said projections at the outer end thereof respectively whereby said support members are adapted to engage said spring means.

2. An air controlled valve assembly as set forth in claim 1 further comprising a check valve support member sealingly located in said outlet means and defining a central axially extending passage with said valve seat located therein, wherein said passage and said projections are formed with complementary cylindrical surfaces to facilitate sliding engagement of said spring guide member therein.

* * * * *